United States Patent
Yagi et al.

(10) Patent No.: US 9,944,180 B2
(45) Date of Patent: Apr. 17, 2018

(54) CONTROL DEVICE FOR ENGINE

(71) Applicant: Mazda Motor Corporation, Aki-gun, Hiroshima (JP)

(72) Inventors: Atsushi Yagi, Hiroshima (JP); Kenji Sasaki, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/159,696

(22) Filed: May 19, 2016

(65) Prior Publication Data

US 2016/0339780 A1    Nov. 24, 2016

(30) Foreign Application Priority Data

May 22, 2015  (JP) ................................. 2015-104637

(51) Int. Cl.
*B60K 26/02*     (2006.01)
*F02D 11/10*     (2006.01)
(Continued)

(52) U.S. Cl.
CPC ............ *B60K 26/02* (2013.01); *F02D 11/105* (2013.01); *B60K 2026/026* (2013.01);
(Continued)

(58) Field of Classification Search
CPC . B60K 26/02; B60K 2026/026; F02D 11/105; F02D 2200/602; F02D 11/106; F02D 13/0215; F02D 11/02; F02D 9/00
See application file for complete search history.

(56) References Cited

U.S. PATENT DOCUMENTS

| 5,470,289 | A | * | 11/1995 | Pioch | ................ | F02P 5/1504 |
| | | | | | | 477/111 |
| 7,291,092 | B2 | * | 11/2007 | Tohta | ................ | B60W 10/06 |
| | | | | | | 477/116 |

(Continued)

FOREIGN PATENT DOCUMENTS

| JP | 2005155412 A | 6/2005 |
| JP | 2005301441 A | 10/2005 |

(Continued)

OTHER PUBLICATIONS

Japan Patent Office, Office Action Issued in Japanese Application No. 2015-104637, dated Feb. 3, 2017, 5 pages.

*Primary Examiner* — Joseph Dallo
(74) *Attorney, Agent, or Firm* — Alleman Hall Creasman & Tuttle LLP

(57) ABSTRACT

A control device for an engine, which controls an engine torque based on operation of an organ-type accelerator pedal is provided. The control device includes an accelerator opening detector for detecting an accelerator opening based on an angle of an accelerator pedal, a target acceleration setter for setting a target acceleration based on the accelerator opening, and an engine controller for adjusting an engine torque to achieve the target acceleration. The accelerator pedal is arranged to have a pedal angle at a predetermined initial pedal angle when the accelerator pedal is not pressed. The target acceleration setter sets the target acceleration to zero when the accelerator pedal is pressed and the accelerator opening is within a range where a difference between the pressed pedal angle and the initial pedal angle is between 2 and 4 degrees.

10 Claims, 13 Drawing Sheets

(51) Int. Cl.
*F02D 13/02* (2006.01)
*F02D 11/02* (2006.01)
*F02D 9/00* (2006.01)

(52) U.S. Cl.
CPC .............. *F02D 9/00* (2013.01); *F02D 11/02* (2013.01); *F02D 11/106* (2013.01); *F02D 13/0215* (2013.01); *F02D 2200/602* (2013.01)

(56) References Cited

U.S. PATENT DOCUMENTS

| | | | |
|---|---|---|---|
| 9,073,534 B2 | 7/2015 | Okada et al. | |
| 2002/0189563 A1* | 12/2002 | Muraki | F01L 1/34 123/90.18 |
| 2005/0215393 A1* | 9/2005 | Shimoda | F16H 61/66259 477/44 |
| 2006/0040790 A1* | 2/2006 | Tohta | B60W 10/06 477/98 |
| 2011/0029209 A1* | 2/2011 | Hattori | F16H 59/40 701/58 |
| 2011/0271788 A1 | 11/2011 | Kawai | |
| 2012/0234128 A1 | 9/2012 | Ohtsubo et al. | |
| 2012/0285287 A1* | 11/2012 | Sakaguchi | B60K 26/021 74/513 |
| 2014/0011638 A1* | 1/2014 | Iwaki | B60W 10/10 477/115 |
| 2016/0258364 A1 | 9/2016 | Takeyoshi et al. | |
| 2016/0258365 A1 | 9/2016 | Takeyoshi et al. | |
| 2016/0273469 A1 | 9/2016 | Takeyoshi et al. | |

FOREIGN PATENT DOCUMENTS

| | | |
|---|---|---|
| JP | 2005343422 A | 12/2005 |
| JP | 2006117020 A | 5/2006 |
| JP | 2006177442 | 7/2006 |
| JP | 2008239130 | 10/2008 |
| JP | WO2010086965 A1 | 7/2012 |
| JP | 5499882 B | 5/2014 |
| JP | 2015017570 A | 1/2015 |

* cited by examiner

CONTROL DEVICE FOR ENGINE

BACKGROUND

The present invention relates to a control device for an engine, particularly to a control device for an engine, which controls an engine torque according to operation of an accelerator pedal performed by a driver.

JP2005-155412A discloses one example of such type of art, in which a target torque of an engine is set based on a state of an accelerator pedal operated by a driver, and a throttle opening and an ignition timing are adjusted to bring an output torque of the engine to the target torque. Specifically, with this art, the output torque of the engine is adjusted to increase an acceleration of the vehicle in a front-and-rear direction of the vehicle as a pressing speed of the accelerator pedal (i.e., a derivative value of an accelerator opening) increases, so as to obtain balance between an acceleration feel and vibration in the vehicle body in the front-and-rear direction.

Meanwhile, for example, when shifting a state of the vehicle from a straight-forward traveling state into a turning state (turn-in), the driver first performs a brake operation and then an accelerator operation to cause the vehicle to travel steadily. With the conventional art, when the driver switches a position of their foot from a brake pedal to the accelerator pedal, it is difficult to swiftly cause the vehicle to travel steadily, specifically, the driver tends to correct the opening of the accelerator pedal to cause the vehicle to travel steadily. Therefore, it is considered preferable that in the situation where the driver switches the position of their foot from the brake pedal to the accelerator pedal, the driver can easily and swiftly cause the vehicle to travel steadily when they perform the accelerator operation. It is considered particularly preferable to be able to cause the vehicle to travel steadily by an accelerator operation performed by the driver without any particular intention.

SUMMARY

The present invention is made in view of solving the problems of the conventional art described above, and aims to provide a control device for an engine which is capable of improving a characteristic of an acceleration with respect to an accelerator operation and easily and swiftly causing a vehicle to travel steadily when the accelerator operation is performed.

According to one aspect of the present invention, a control device for an engine is provided. The control device controls an engine torque based on operation of an organ-type accelerator pedal and includes a processor configured to execute an accelerator opening detector for detecting an accelerator opening based on an angle of an accelerator pedal having a stepping surface, a target acceleration setter for setting a target acceleration of a vehicle based on the accelerator opening detected by the accelerator opening detector, and an engine controller for adjusting an engine torque to achieve the target acceleration set by the target acceleration setter. The accelerator pedal is arranged to have a pedal angle at a predetermined initial pedal angle in a state where the accelerator pedal is not pressed, the pedal angle being an angle of the stepping surface with respect to a horizontal surface. The target acceleration setter sets the target acceleration to zero when the accelerator pedal is pressed and the accelerator opening detected by the accelerator opening detector is within a range of the accelerator opening where a difference between the pressed pedal angle and the initial pedal angle is between 2 and 4 degrees.

With the above configuration, the target acceleration is set to zero when the accelerator pedal is pressed and the accelerator opening detected by the accelerator opening detector is within the range of the accelerator opening where the difference between the pressed pedal angle and the initial pedal angle is between 2 and 4 degrees. The range of the accelerator opening corresponds to a range of an ankle angle where loads on muscles of a leg which is used in the accelerator operation become minimum values. Therefore, according to the present invention, since the target acceleration is set to zero in such a range of the accelerator opening, in a situation where, for example, a driver switches a position of their foot from a brake pedal to the accelerator pedal for a turn-in, the driver can easily and swiftly cause the vehicle to travel steadily by naturally placing their foot on the accelerator pedal with no particular intention.

Note that the initial pedal angle may be set according to a relationship between a seating position (hip point) of the driver and an arranged position of the accelerator pedal, and the accelerator pedal may be configured to apply a reaction force (pedal reaction force) that balances out with a weight of the leg and the foot themselves, so that the accelerator pedal is not affected by the weight of the leg and foot themselves which operate the accelerator pedal.

The initial pedal angle of the accelerator pedal may be 75 degrees. The target acceleration setter may set the target acceleration to zero when the accelerator opening detected by the accelerator opening detector is within a range of the accelerator opening where the pressed pedal angle is between 71 and 73 degrees.

With the above configuration, for a vehicle in which the accelerator pedal is arranged so that the accelerator pedal is pressed by a movement of an ankle using the muscles of the leg and applying hardly any of the weight of the leg and foot themselves on the accelerator pedal (e.g., a sports car), the target acceleration is set to zero within the range of the ankle angle where the muscle load of the leg which is used in the accelerator operation becomes a minimum value (uniquely corresponding to the range of the accelerator opening). Thus, the driver can easily and swiftly cause the vehicle to travel steadily by performing the accelerator operation with no particular intention.

The target acceleration setter may set the target acceleration to zero when the accelerator opening detected by the accelerator opening detector is within a range of the accelerator opening between 13 and 27%.

Also with the above configuration, the target acceleration is set to zero within the range of the accelerator opening corresponding to the range of the ankle angle where the muscle load of the leg which is used in the accelerator operation becomes a minimum value. Thus, the driver can easily and swiftly cause the vehicle to travel steadily by simply naturally placing their foot on the accelerator pedal with no particular intention.

The target acceleration setter may increase the accelerator opening at which the target acceleration is set to zero, as a speed of the vehicle increases.

With the above configuration, the accelerator opening at which the target acceleration is set to zero is increased as the vehicle speed increases so that a pressing force of the accelerator pedal becomes larger. Thus, information indicating that an engine load is high can suitably be transmitted to the driver through the accelerator operation. As a result, a unity between the driver and the vehicle can be increased.

The target acceleration setter may increase the accelerator opening at which the target acceleration is set to zero, as a gear position becomes higher.

With the above configuration, the accelerator opening at which the target acceleration is set to zero is increased as the gear position becomes higher (i.e., as a higher gear position is applied) so that the pressing force of the accelerator pedal becomes larger. Thus, the information indicating that the engine load is high can suitably be transmitted to the driver through the accelerator operation. As a result, the unity between the driver and the vehicle can be increased.

DETAILED DESCRIPTION OF EMBODIMENT

Hereinafter, a control device for an engine according to one embodiment of the present invention is described with reference to the appended drawings.
<System Configuration>

Figure 1:
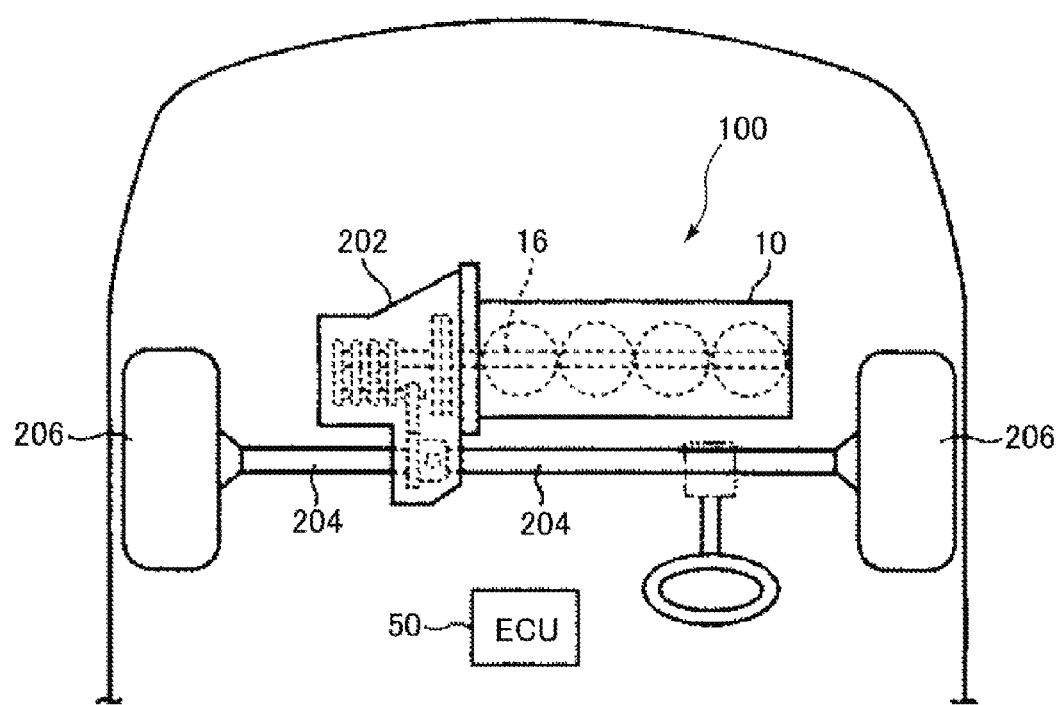
FIG. 1 is a plan view illustrating a schematic configuration of a vehicle to which a control device for an engine according to one embodiment of the present invention is applied.
Figure 2:
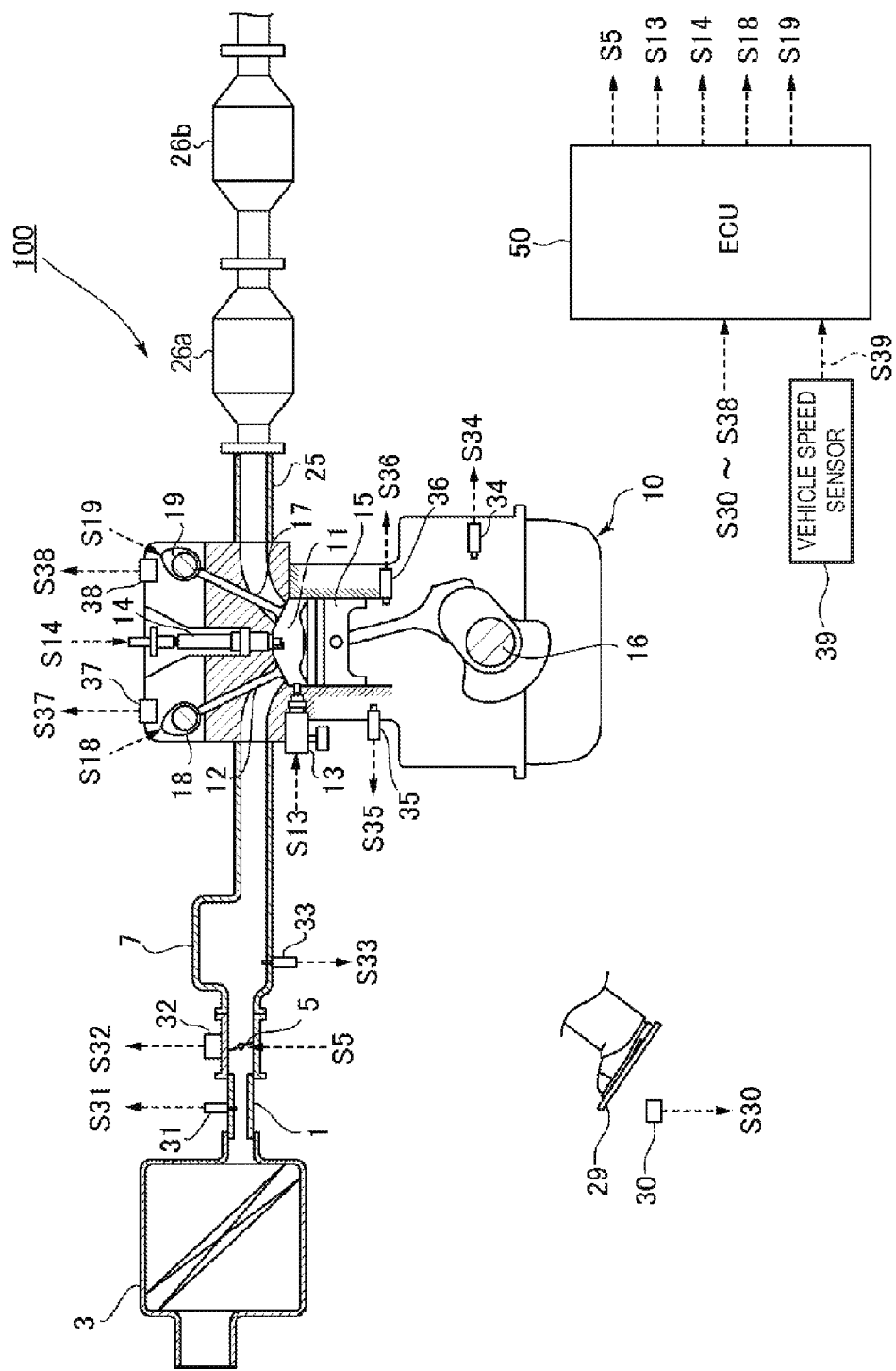
FIG. 2 is a view illustrating a schematic configuration of an engine system to which the control device for the engine according to the embodiment of the present invention is applied.

First, an engine system to which the control device for the engine according to this embodiment is applied is described with reference to FIGS. 1 and 2. FIG. 1 is a plan view illustrating a schematic configuration of a vehicle to which the control device for the engine according to this embodiment is applied. FIG. 2 is a view illustrating a schematic configuration of an engine system to which the control device for the engine according to this embodiment is applied.

As illustrated in FIG. 1, in the vehicle, the engine 10 of the engine system 100 produces an engine torque (drive torque) as a thrust of the vehicle by causing combustion of mixture gas containing fuel and air, and transfers the engine torque to a transmission 202 via a crankshaft 16. The transmission 202 changes a gear position among a plurality of positions (e.g., first to sixth ranges), and at a gear position set by the transmission 202, the engine torque from the engine 10 is transferred, via a pair of drive shafts 204, to a pair of wheels 206 attached to outer end parts of the drive shafts 204 in vehicle width directions, respectively. For example, the transmission 202 is a manual transmission of which gear position is selected at the discretion of the driver of the vehicle.

Further, in the vehicle, an ECU (Electronic Control Unit) 50 performs various controls within the vehicle. In this embodiment, the ECU 50 functions as the control device of the engine. According to operation of an accelerator pedal by the driver, the ECU 50 controls the engine torque which is outputted by the engine 10, and supplies the engine torque to the vehicle. Thus, a desired acceleration characteristic in relation to the accelerator operation can be achieved.

As illustrated in FIG. 2, the engine system 100 includes an intake passage 1 through which intake air (air) introduced from outside passes, the engine (specifically, gasoline engine) 10 for producing a drive force of the vehicle by causing combustion of the mixture gas containing the intake air supplied from the intake passage 1 and the fuel supplied from a fuel injector 13 (described later), an exhaust passage 25 through which exhaust gas produced by the combustion within the engine 10 is discharged, sensors 30 to 39 for detecting various states regarding the engine system 100, and the ECU 50 for controlling the engine system 100 entirely.

The intake passage 1 is provided with, from its upstream side in the following order, an air cleaner 3 for purifying the intake air introduced from outside, a throttle valve 5 for adjusting an amount of intake air passing therethrough (intake air amount), and a surge tank 7 for temporarily storing the intake air to be supplied to the engine 10.

The engine 10 mainly includes an intake valve 12 for introducing, into a combustion chamber 11, the intake air supplied from the intake passage 1, the fuel injector 13 for injecting the fuel to the combustion chamber 11, an ignition plug 14 for igniting the mixture gas (containing the intake air and the fuel) supplied into the combustion chamber 11, a piston 15 for reciprocating due to the combustion of the mixture gas within the combustion chamber 11, the crankshaft 16 which is rotated in conjunction with the reciprocation of the piston 15, and an exhaust valve 17 for discharging, to the exhaust passage 25, the exhaust gas produced by the combustion of the mixture gas within the combustion chamber 11.

Moreover, the engine 10 varies operation timings of the intake and exhaust valves 12 and 17 (corresponding to phases of the valves) by a variable intake valve mechanism 18 and a variable exhaust valve mechanism 19 (both being a variable valve timing mechanism), respectively. Various known types may be applied for the variable intake valve mechanism 18 and the variable exhaust valve mechanism 19, and for example, an electromagnetic type mechanism or a hydraulic type mechanism may be used to change the operation timings of the intake and exhaust valves 12 and 17.

The exhaust passage 25 is mainly provided with exhaust gas purifying catalysts 26a and 26b having a function of purifying the exhaust gas, such as an NOx catalyst, a three-way catalyst, or an oxidation catalyst. Hereinafter, when the exhaust gas purifying catalysts 26a and 26b are not differentiated, they may each simply be described as the "exhaust gas purifying catalyst 26."

Further, the engine system 100 is provided with the sensors 30 to 39 for detecting the various states regarding the engine system 100. The sensors 30 to 39 are specifically as follows: the accelerator opening sensor 30 for detecting an accelerator opening based on a position (angle) of the accelerator pedal 29 (corresponding to an amount by which the accelerator pedal 29 is pressed by the driver); the airflow sensor 31 for detecting the intake air amount corresponding to the flow rate of the intake air passing through the intake passage 1; the throttle opening sensor 32 for detecting an opening of the throttle valve 5 (throttle opening); the pressure sensor 33 for detecting intake manifold pressure corresponding to pressure of the intake air which is applied to the engine 10; the crank angle sensor 34 for detecting a crank angle of the crankshaft 16; the water temperature sensor 35 for detecting a temperature of cooling water for cooling the engine 10 (water temperature); the temperature sensor 36 for detecting a temperature inside a cylinder of the engine 10 (in-cylinder temperature); the cam angle sensors 37 and 38 for detecting the operation timings (including close timings) of the intake and exhaust valves 12 and 17, respectively; and the vehicle speed sensor 39 for detecting the speed of the vehicle (vehicle speed). These various sensors 30 to 39 output respective detection signals S30 to S39 corresponding to the detected parameters, to the ECU 50.

The ECU 50 controls the components of the engine system 100 based on the detection signals S30 to S39 received from the various sensors 30 to 39 described above. Specifically, the ECU 50 supplies a control signal S5 to the throttle valve 5 to adjust open and close timings of the throttle valve 5 and the throttle opening, supplies a control signal S13 to each fuel injector 13 to adjust a fuel injection amount and a fuel injection timing, supplies a control signal S14 to each ignition plug 14 to adjust an ignition timing, and supplies control signals S18 and S19 to the variable intake valve mechanism 18 and the variable exhaust valve mechanism 19 to adjust the operation timings of the intake and exhaust valves 12 and 17, respectively.

Figure 3:
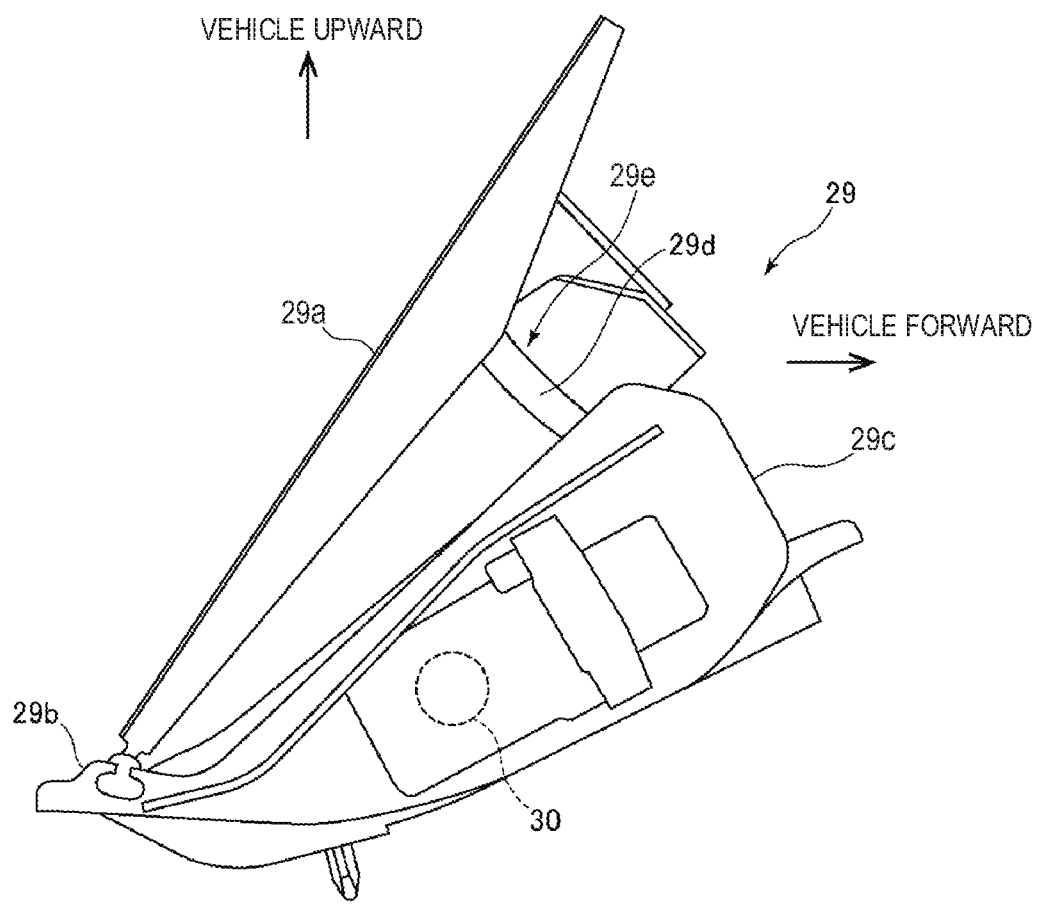
FIG. 3 is a side view of an accelerator pedal according to the embodiment of the present invention.

Next, a structure of the accelerator pedal 29 of this embodiment is described with reference to FIG. 3. FIG. 3 is a side view of the accelerator pedal 29 according to this embodiment.

As illustrated in FIG. 3, the accelerator pedal 29 is structured as an organ type and includes a pedal part 29a having a stepping surface which the driver presses with the sole of their foot, and a base part 29b. The pedal part 29a is pivotably attached to the base part 29b. The pedal part 29a is pivotably supported by the base part 29b at a lower end thereof and, when being pressed by the sole of the driver's foot, it pivots by a predetermined angle (e.g., 15 degrees) from an initial position corresponding to when no load is applied (corresponding to a position of an initial pedal angle) to a terminal position on a vehicle forward side.

Further, a housing 29c integrally formed with the base part 29b is provided below the pedal part 29a. A return spring (not illustrated) is provided inside the housing 29c and a plurality of links 29d (specifically, a total of three links in this embodiment; however, only one of the links is illustrated in FIG. 3) are provided between an interior structural body of the housing 29c and the pedal part 29a. The return spring and the plurality of links 29d all constitute a pedal reaction force generating mechanism 29e. The pedal reaction force generating mechanism 29e generates a reaction force in proportion to a pivot amount of the pedal part 29a.

Moreover, the housing 29c is provided with the accelerator opening sensor 30 described above. The accelerator opening sensor 30 generates the detection signal S30 based on an accelerator opening corresponding to the pivot position (angle) of the pedal part 29a.

Note that a kick down switch (not illustrated) for generating a predetermined peak reaction force that is larger than a peak reaction force generated by the pedal reaction force generating mechanism 29e may also be provided in a top surface part of the housing 29c to act against the pivot motion toward the terminal position of the pedal part 29a. The top surface part of the housing 29c opposes a lower surface of the pedal part 29a.

Figure 4:
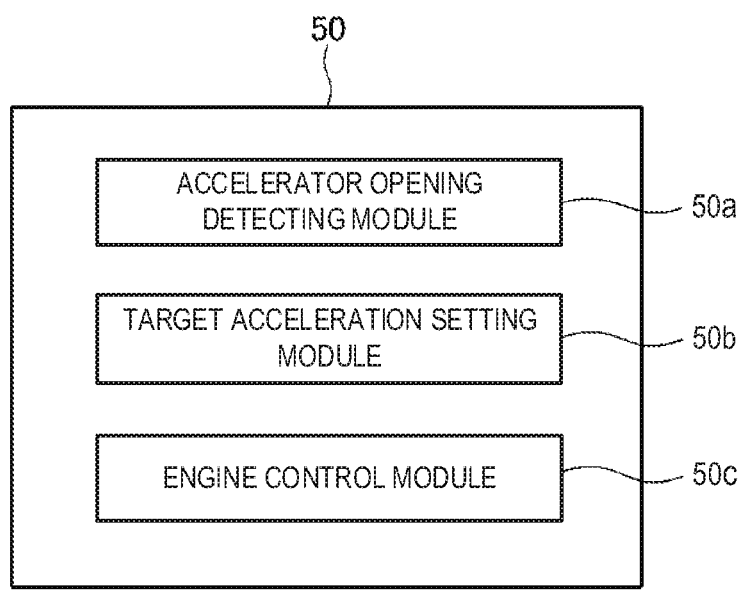
FIG. 4 is a block diagram illustrating a functional configuration of an engine control unit (ECU) according to the embodiment of the present invention.

Next, a functional configuration of the ECU 50 of this embodiment is described with reference to FIG. 4. As illustrated in FIG. 4, the ECU 50 of this embodiment has at least one processor configured to execute an accelerator opening detecting module 50a (e.g., an accelerator opening detector), a target acceleration setting module 50b (e.g., a target acceleration setter), and an engine control module 50c (e.g., an engine controller).

The accelerator opening detecting module 50a acquires the accelerator opening (e.g., expressed in "%") based on the detection signal S30 outputted by the accelerator opening sensor 30.

The target acceleration setting module 50b sets a target acceleration of the vehicle based on the accelerator opening acquired by the accelerator opening detecting module 50a. Specifically, the target acceleration setting module 50b sets the target acceleration corresponding to the accelerator opening acquired by the accelerator opening detecting module 50a, by referring to a map in which the target acceleration to be set in relation to the accelerator opening is defined before use (hereinafter, referred to as the "acceleration characteristic map"). This acceleration characteristic map is defined for every predetermined vehicle speed and gear position.

The engine control module 50c adjusts the engine torque to achieve the target acceleration set by the target acceleration setting module 50b. Specifically, the engine control module 50c sets a target torque required for shifting an actual acceleration to the target acceleration, and controls the throttle valve 5 and/or the intake valve 12 through the variable intake valve mechanism 18, and additionally controls the fuel injector 13, etc., so as to cause the engine 10 to output the target torque.

Thus, the ECU 50 may be referred to as the "control device for the engine."

<Acceleration Characteristic>

Next, the acceleration characteristic designed in relation to the accelerator operation performed by the driver, which is applied in this embodiment, is described. In this embodiment, the acceleration characteristic is designed by taking into consideration loads on muscles of a leg when the driver performs the accelerator operation. Therefore, the loads applied on the muscles of the leg when the driver performs the accelerator operation are first described with reference to FIGS. 5 to 8.

Figure 5:
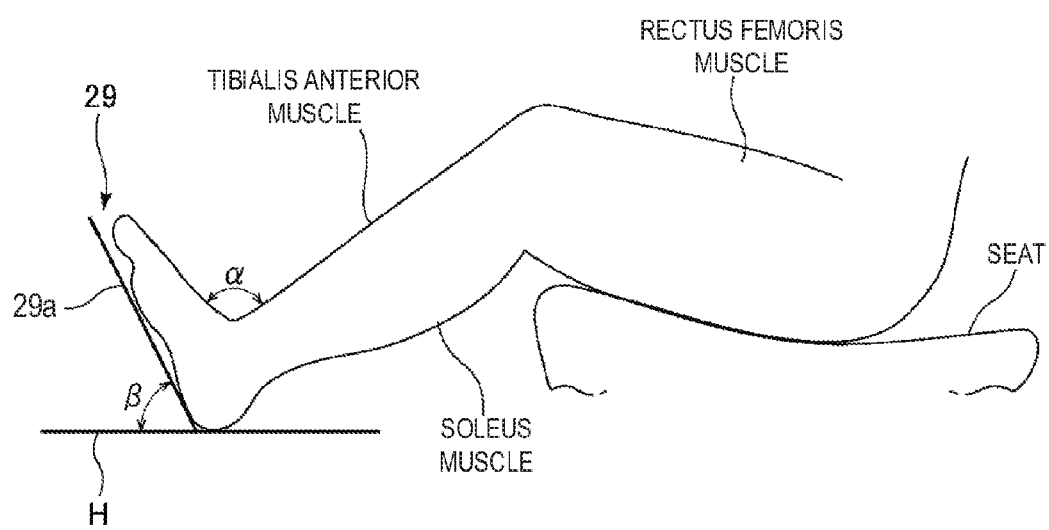
FIG. 5 is a diagram illustrating muscles of a leg used when a driver performs an accelerator operation.

FIG. 5 is a diagram illustrating the muscles of the leg used when the driver performs the accelerator operation. Specifically, FIG. 5 is an enlarged side view of a periphery area of the leg of the driver operating the accelerator pedal. In the vehicle of this embodiment (e.g., a sports car), as illustrated in FIG. 5, a seating position (hip point) of the driver is set low. Specifically, the seating position is close to a position of the pedal part 29a of the accelerator pedal 29 in a height direction of the vehicle. In such a positional relationship between the seating position and the pedal part 29a, the driver presses the pedal part 29a by a movement of their ankle using the rectus femoris muscle, tibialis anterior muscle, and soleus muscle of their leg while keeping the heel of their foot at a horizontal surface H (vehicle floor) and applying hardly any of the weight of the leg and foot themselves on the pedal part 29a (since a major part of the weight of the leg itself is placed on the heel). Thus, for example, in the sports car, the pedal part 29a of the accelerator pedal 29 can be operated in a state where the weight of the leg and foot themselves, which may influence an acceleration operation, are eliminated as much as possible.

Here, as illustrated in FIG. 5, an angle between an instep of the foot and a shin of the leg (see the reference character α) is defined as "ankle angle," and an angle between the stepping surface of the pedal part 29a of the accelerator pedal 29 and the horizontal surface H (vehicle floor) on which the accelerator pedal 29 is provided (see the reference character β) is defined as "pedal angle." The accelerator pedal 29 is provided to have a pedal angle (initial pedal angle) of 75 degrees in a state where the pedal part 29a of the accelerator pedal 29 is not pressed. Such an initial pedal angle is determined under an assumption that the pedal part 29a is pressed by a motion of the ankle using the rectus femoris muscle, the tibialis anterior muscle, and the soleus muscle of the leg while applying hardly any of the weight of the leg and foot themselves on the pedal part 29a, and the initial pedal angle is larger than that in a configuration designed under an assumption that the pedal part 29a is pressed using the weight of the leg and foot themselves (in this configuration, the seating position is higher than the position of the pedal part 29a of the accelerator pedal 29 in the height direction).

In this embodiment, the application to the vehicle in which the initial pedal angle of the accelerator pedal 29 is set according to the relationship between the seating position (hip point) of the driver and the arranged position of the accelerator pedal 29 as illustrated in FIG. 5 is assumed, and the following description is given under a condition that the configuration of such a vehicle is applied.

Figure 6:
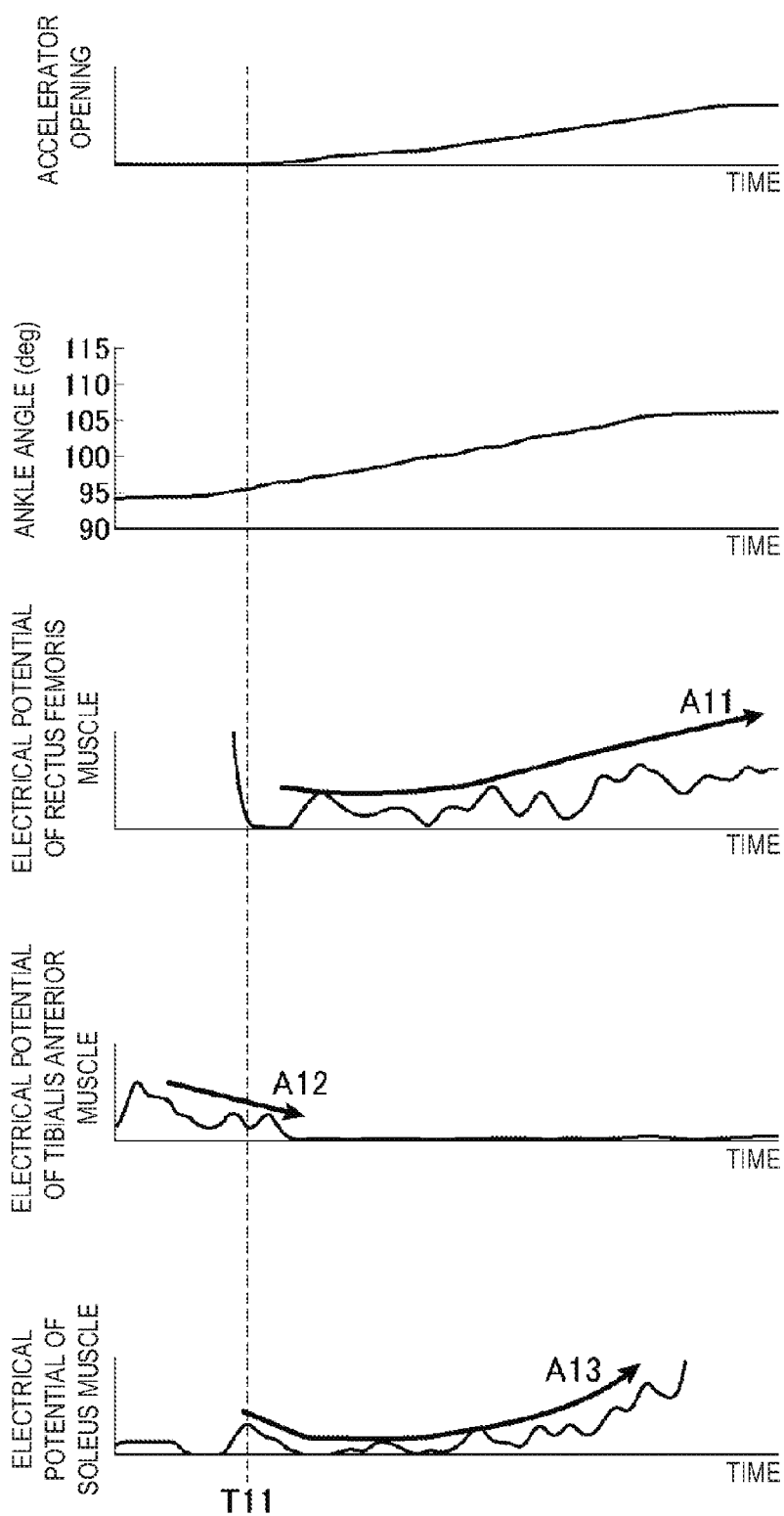
FIG. 6 shows time charts illustrating one example of changes of loads on the muscles of the leg when the driver performs the accelerator operation.

FIG. 6 shows time charts illustrating one example of changes of loads on the muscles of the leg when the driver performs the accelerator operation. In FIG. 6, temporal changes of the accelerator opening, the ankle angle, an electrical potential of the rectus femoris muscle, an electrical potential of the tibialis anterior muscle, and an electrical potential of the soleus muscle (each of the electrical potentials is measured by an electromyograph) are illustrated in this order from the top. As illustrated in FIG. 6, the accelerator pedal 29 is gradually pressed from a time point T11, and accordingly, the accelerator opening and the ankle angle gradually increase. It can be understood that when the ankle angle is changed according to the accelerator operation as above, the electrical potentials of the rectus femoris muscle, the tibialis anterior muscle, and the soleus muscle first drop, and then the electrical potentials of the rectus femoris muscle and the soleus muscle start to increase (see the arrows A11, A12, and A13).

Figure 7:
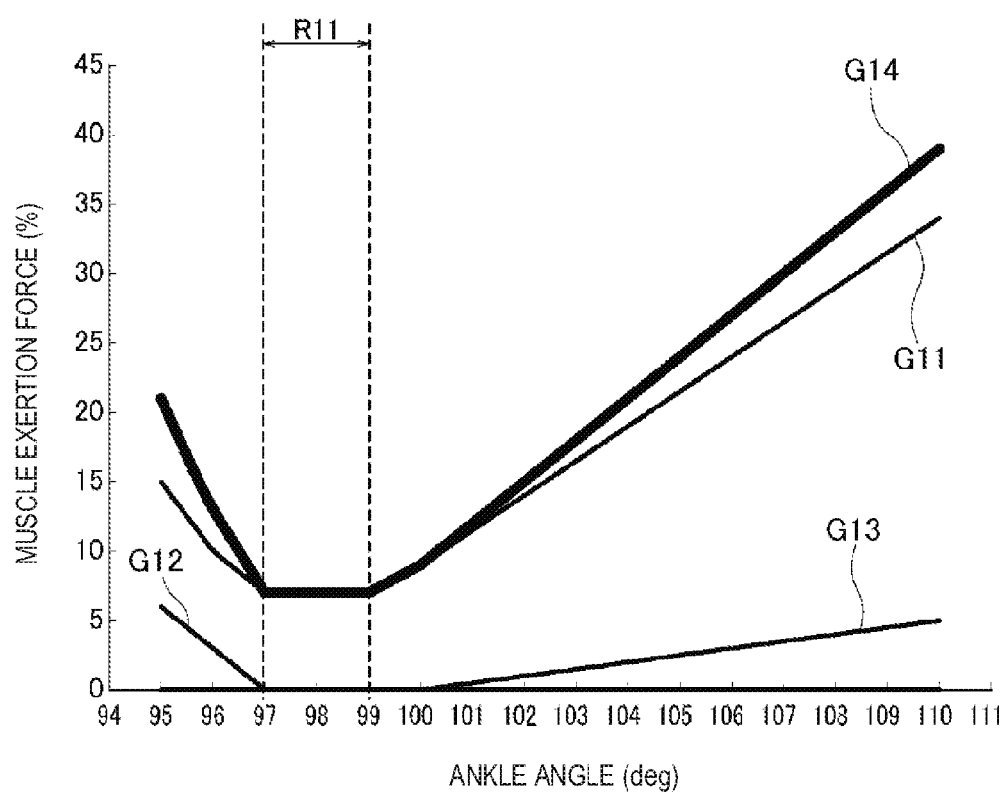
FIG. 7 is a chart illustrating relationships of an ankle angle with exertion forces of a rectus femoris muscle, a tibialis anterior muscle, and a soleus muscle when the ankle angle is changed.

FIG. 7 is a chart illustrating relationships of the ankle angle (deg) with exertion forces (%) of the rectus femoris muscle, the tibialis anterior muscle, and the soleus muscle, respectively, when the ankle angle is changed. In FIG. 7, the chart G11 indicates the exertion force of the rectus femoris muscle, the chart G12 indicates the exertion force of the tibialis anterior muscle, and the chart G13 indicates the exertion force of the soleus muscle. Further, the chart G14 indicates a total exertion force of the exertion forces of the rectus femoris muscle, the tibialis anterior muscle, and the soleus muscle. Note that each of the charts G11 to G13 is obtained by, for example, measuring the muscle exertion force in a change of the ankle angle of multiple people, and averaging the measurement results obtained therefrom.

Based on the chart G14, it can be understood that the total exertion force of the exertion forces of the rectus femoris muscle, the tibialis anterior muscle, and the soleus muscle become a minimum force when the ankle angle is between 97 and 99 degrees (see the reference character R11). Therefore, it can be said that when the ankle angle is between 97 and 99 degrees, the loads on the muscles (muscle load) which are used to move the ankle become minimum values, in other words, the muscle load when the ankle is moved to perform the accelerator operation becomes a minimum value.

Figure 8:
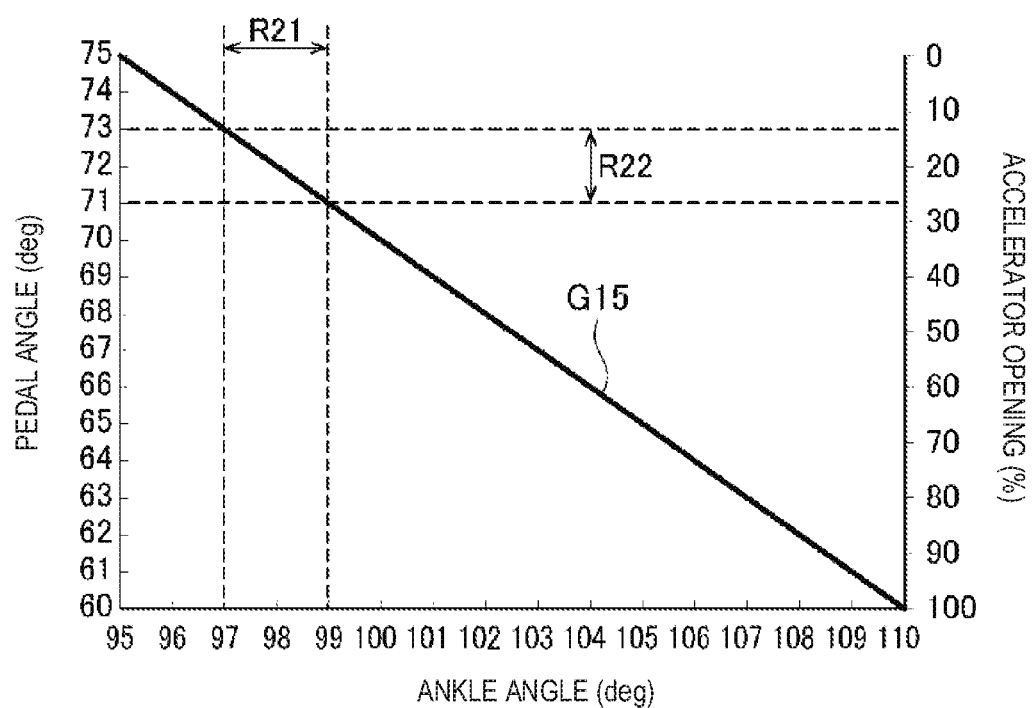
FIG. 8 is a chart illustrating relationships of the ankle angle with a pedal angle and an accelerator opening, respectively, when the driver performs the accelerator operation.

FIG. 8 is a chart illustrating relationships of the ankle angle (deg) with the pedal angle (deg) and the accelerator opening (%) when the driver performs the accelerator operation. Specifically, the chart G15 in FIG. 8 indicates a pedal angle and an accelerator opening corresponding to an ankle angle of an average-sized driver performing an accelerator operation. As indicated in the chart G15, as the driver increases the ankle angle in the accelerator operation, the pedal angle reduces and the accelerator opening increases. Note that the pedal angle and the accelerator opening uniquely correspond to each other (similar below).

The reference character R21 in FIG. 8 indicates the above-described range of the ankle angle between 97 and 99 degrees where the muscle load applied when the ankle is moved becomes a minimum value (also see the reference character R11 in FIG. 7), and within this range of the ankle angle, the pedal angle and the accelerator opening are within a range indicated by the reference character R22. Specifically, within the range of the ankle angle between 97 and 99 degrees, the pedal angle is within a range between 71 and 73 degrees and the accelerator opening is within a range between 13 and 27 percent. Therefore, when the pedal angle is within the range between 71 and 73 degrees, in other words, when the accelerator opening is within the range between 13 and 27 percent, the loads on the muscles (muscle load) of the leg which are used in the accelerator operation becomes minimum values.

Upon yielding such a result as described above, in this embodiment, when the accelerator operation is performed within the range of the ankle angle where the muscle load of the leg becomes a minimum value, the control is performed to adjust the acceleration applied to the vehicle to be zero, in other words, the control is performed to balance out traveling resistance (including air resistance, road surface resistance and resistance due to a road gradient) with a drive force supplied to the wheels. Thus, for example, when the driver switches a position of their foot from a brake pedal to the accelerator pedal 29 for a turn-in, the driver can simply place their foot on the accelerator pedal 29 naturally and with no specific intention to easily and swiftly cause the vehicle to travel steadily. More specifically, in this embodiment, the acceleration characteristic map to be used by the target acceleration setting module 50b of the ECU 50 described above is defined to set the target acceleration to zero within the range of the pedal angle between 71 and 73 degrees corresponding to the range of the ankle angle where the muscle load of the leg in the accelerator operation becomes a minimum value (within this range of the pedal angle, a difference between the pedal angle and the initial pedal angle (75 degrees) is 2 to 4 degrees), in other words, within the range of the accelerator opening between 13 and 27 percent.

Figure 9A:
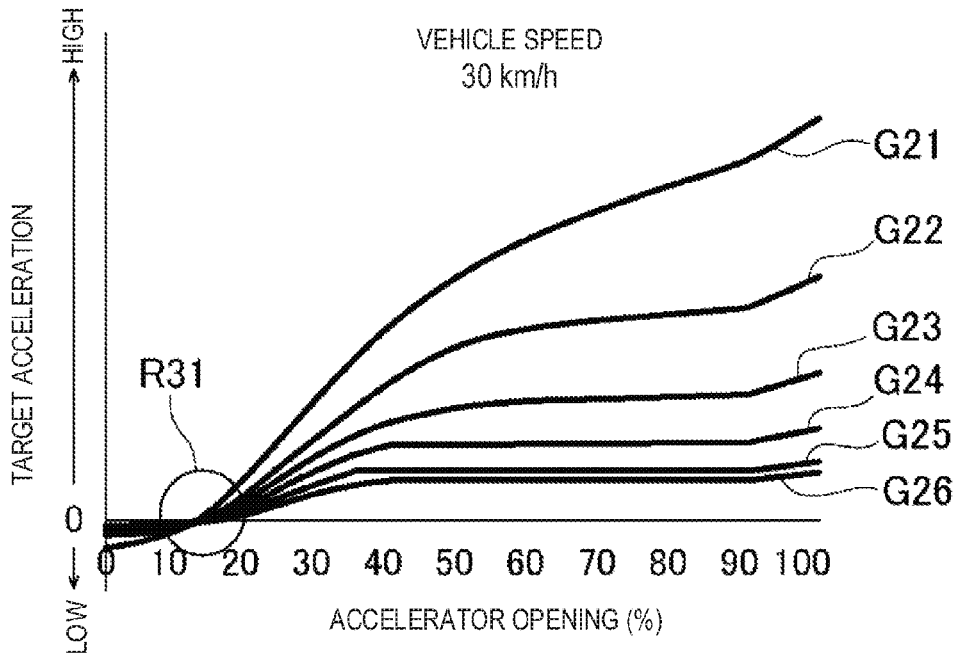
FIGS. 9A to 9C are charts illustrating one example of acceleration characteristic maps for predetermined vehicle speeds and gear positions, respectively, according to the embodiment of the present invention.
Figure 9B:
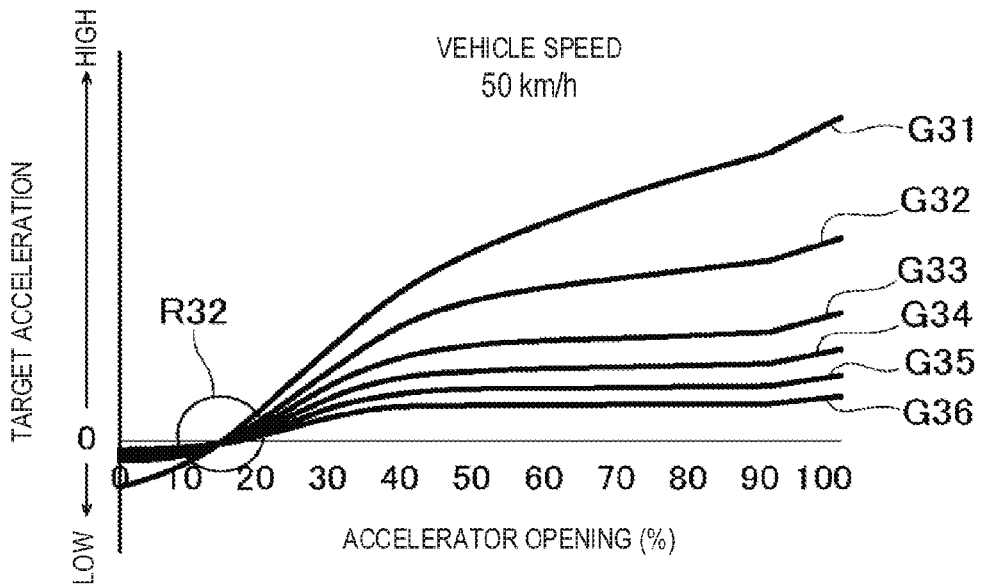
Figure 9C:
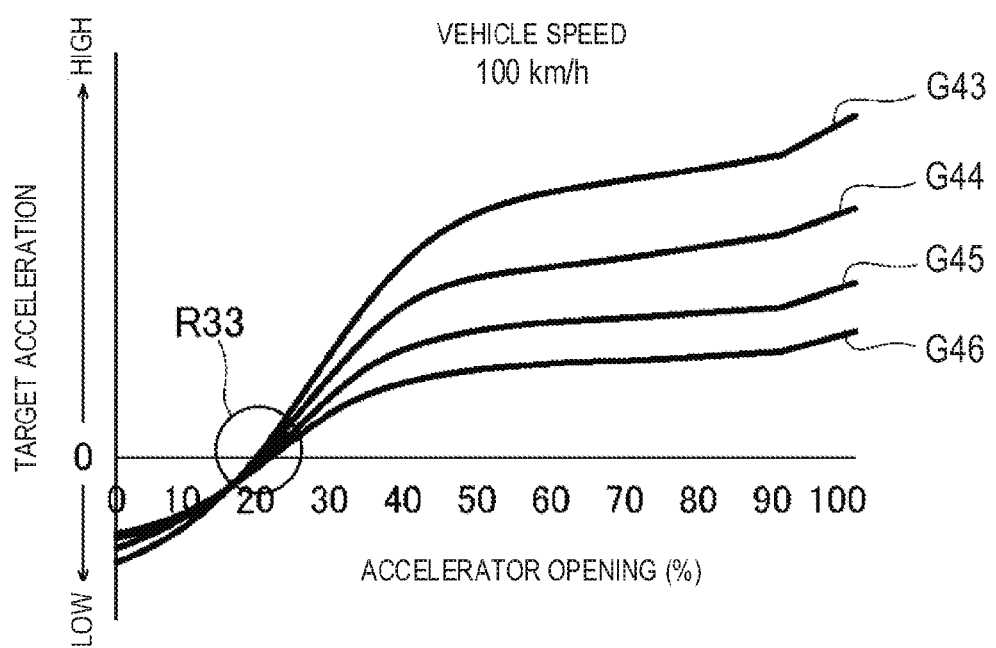

The acceleration characteristic map of this embodiment is described in detail with reference to FIGS. 9A to 9C. FIGS. 9A to 9C are charts illustrating one example of the acceleration characteristic maps for predetermined vehicle speeds and gear positions, respectively, according to this embodiment. In each of FIGS. 9A to 9C, the horizontal axis indicates the accelerator opening and the vertical axis indicates the target acceleration.

Specifically, FIG. 9A illustrates acceleration characteristic maps applied at a vehicle speed of 30 km/h, FIG. 9B illustrates acceleration characteristic maps applied at a vehicle speed of 50 km/h, and FIG. 9C illustrates acceleration characteristic maps applied at a vehicle speed of 100 km/h. Further, the charts G21 to G26 in FIG. 9A indicate acceleration characteristic maps applied for the gear positions of the first to sixth ranges, respectively. The charts G31 to G36 in FIG. 9B indicate acceleration characteristic maps applied for the gear positions of the first to sixth ranges, respectively. The charts G43 to G46 in FIG. 9C indicate acceleration characteristic maps applied for the gear positions of the third to sixth ranges, respectively.

Note that although the acceleration characteristic maps applied at 30 km/h, 50 km/h, and 100 km/h are illustrated in FIGS. 9A to 9C as examples, practically, acceleration characteristic maps for various other vehicle speeds are also prepared. Further, in FIG. 9C, since the vehicle speed is comparatively high at 100 km/h and maps for low gear positions (first and second ranges) are usually not used at this vehicle speed, the illustration of these maps is omitted.

As indicated in the reference characters R31, R32, and R33 in FIGS. 9A to 9C, in this embodiment, the acceleration characteristic maps are defined to set the target acceleration to zero within the above described range of the accelerator opening between 13 and 27 percent (see the reference character R22 in FIG. 8), which corresponds to the range of the ankle angle between 97 and 99 degrees where the muscle load of the leg in the accelerator operation becomes a minimum value (see the reference character R21 in FIG. 8). Specifically, the acceleration characteristic maps are defined to set the target acceleration to zero within the range of the accelerator opening between 13 and 27 percent, regardless of the vehicle speed and gear position. More specifically, in this embodiment, the accelerator opening at which the target acceleration is set to zero is increased as the vehicle speed increases, and the accelerator opening at which the target acceleration is set to zero is slightly increased as the gear position becomes higher (i.e., as a higher gear position is applied).

Figure 10:
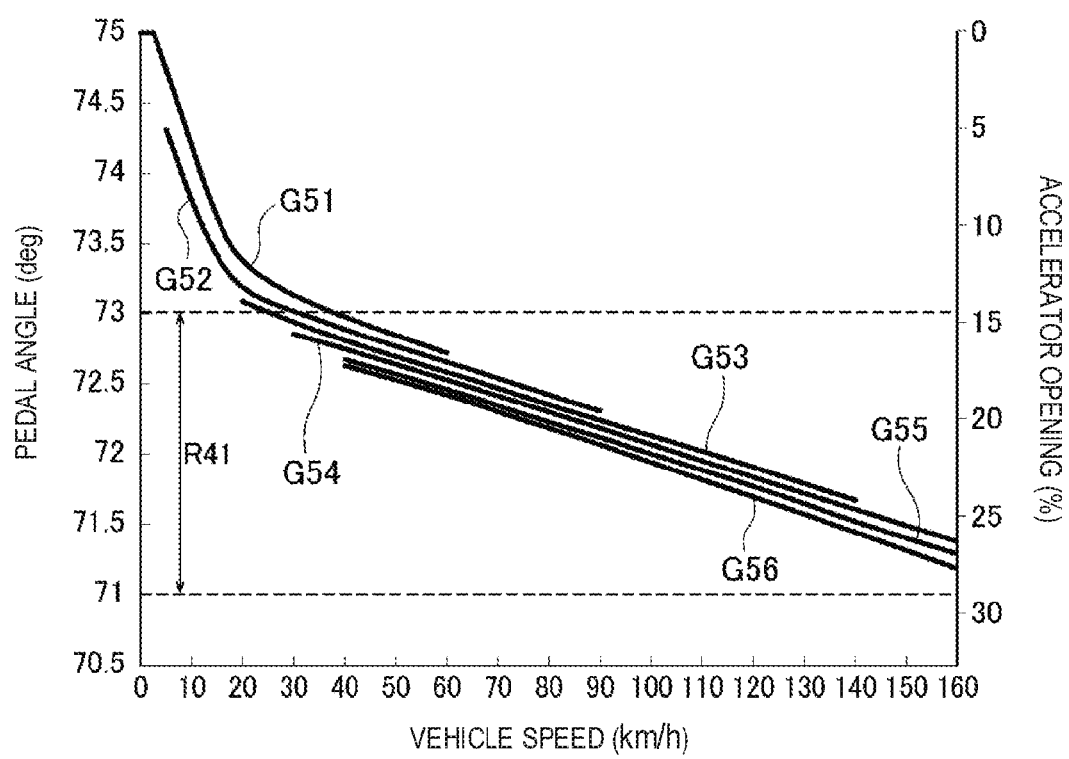
FIG. 10 is a diagram illustrating the pedal angle and the accelerator opening at which a target acceleration is set to zero according to the vehicle speed and the gear position, according to the embodiment of the present invention.

Here, in this embodiment, the pedal angle and the accelerator opening at which the target acceleration is set to zero in relation to the vehicle speed and gear position is described with reference to FIG. 10. In FIG. 10, the horizontal axis indicates the vehicle speed (km/h) and the vertical axis indicates the pedal angle (deg) and the accelerator opening (%). Specifically, the charts G51 and G56 indicate relationships of the vehicle speed with the pedal angle and the accelerator opening at which the target acceleration is set to zero in the acceleration characteristic maps, at the gear positions of the first to sixth ranges, respectively. Further, the reference character R41 indicates the range of the pedal angle between 71 and 73 degrees and the range of the accelerator opening between 13 and 27 percent (see the reference character and R22 in FIG. 8), which correspond to the range of the ankle angle between 97 and 99 degrees where the muscle load of the leg in the accelerator operation becomes a minimum value (see the reference character and R21 in FIG. 8).

As illustrated in FIG. 10, in this embodiment, the acceleration characteristic maps are defined so that the accelerator opening at which the target acceleration is set to zero is slightly increased as the vehicle speed increases, and the accelerator opening at which the target acceleration is set to zero is gradually increased as the gear position becomes higher (i.e., as a higher gear position is applied). The acceleration characteristic maps are defined as above so that when the vehicle speed and the gear position become high, the pressing force of the accelerator pedal 29 becomes large due to the increase of the accelerator opening at which the target acceleration is set to zero and, thus, information indicating that an engine load is high (since the engine load becomes high when the vehicle speed and the gear position are high) is transmitted to the driver through the accelerator operation. Thus, the unity between the driver and the vehicle is increased.

Note that within a low vehicle speed range of 20 km or less, the acceleration is swiftly increased as the accelerator opening is increased (i.e., the corresponding accelerator characteristic map is not designed to set the target accelerator to zero) in view of prioritizing accelerating the vehicle, because it is unlikely to keep the vehicle speed as low as 20 km or less.

<Control>

Figure 11:
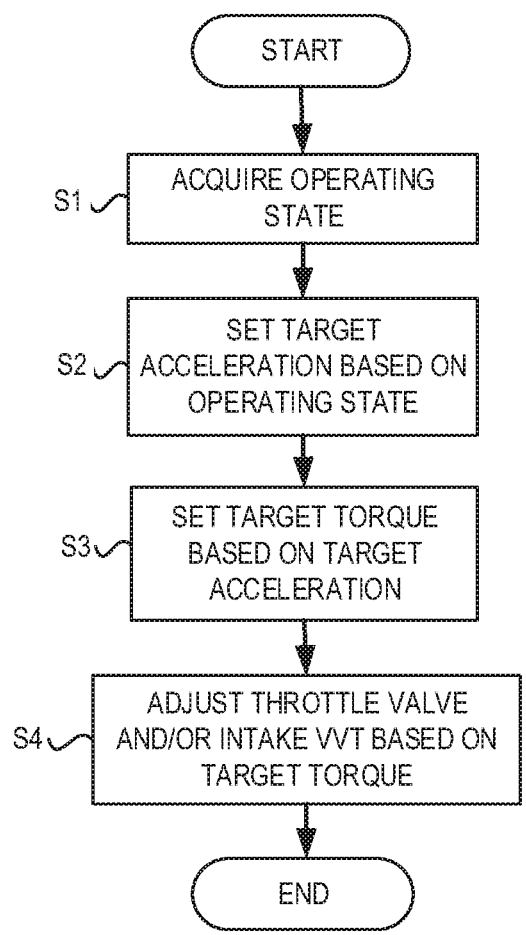
FIG. 11 is a flowchart illustrating an engine control according to the embodiment of the present invention.

Next, the engine control of this embodiment is described with reference to FIG. 11, which is a flowchart illustrating the engine control according to this embodiment. This flow is repeated at a predetermined time cycle by the ECU 50 of the engine system 100.

First at S1, the ECU 50 acquires an operating state of the vehicle. Specifically, the ECU 50 acquires, as the operating state of the vehicle, the accelerator opening detected by the accelerator opening sensor 30 (specifically, the accelerator opening acquired by the accelerator opening detecting module 50a of the ECU 50 based on the detection signal S30 outputted by the accelerator opening sensor 30), the vehicle speed detected by the vehicle speed sensor 39, the gear position currently set at the transmission 202, etc.

Next at S2, the target acceleration setting module 50b of the ECU 50 sets the target acceleration based on the accelerator opening, the vehicle speed, and the gear position acquired at S1. Specifically, the target acceleration setting module 50b selects an acceleration characteristic map corresponding to the current vehicle speed and the current gear position, from the acceleration characteristic maps defined for the various vehicle speeds and gear positions (the acceleration characteristic maps are created and stored in a memory or the like before use), such as those illustrated in FIGS. 9A to 9C. The target acceleration setting module 50b determines (sets) the target acceleration corresponding to the current accelerator opening by referring to the selected acceleration characteristic map.

Then, at S3, the engine control module 50c of the ECU 50 sets the target torque of the engine 10 so as to achieve the target acceleration set at S2. In this case, the engine control module 50c sets the target torque based on the current vehicle speed, etc., because when the vehicle speed increases, the traveling resistance becomes high, and therefore, the target torque needs to be set high. Moreover, the engine control module 50*c* sets the target torque within a range that the engine 10 can output.

Subsequently, at S4, the engine control module 50*c* controls the engine 10 to output the target torque set at S3. Specifically, the engine control module 50*c* adjusts the opening of the throttle valve 5 and/or the operation timing of the intake valve 12 through the variable intake valve mechanism 18 (intake VVT control) by taking into consideration the intake air amount detected by the airflow sensor 31, so that the air amount corresponding to the target torque is introduced into the engine 10. The engine control module 50*c* also controls the fuel injector 13 to inject the fuel injection amount determined based on the theoretical air-fuel ratio thereof with the air amount which corresponds to the target torque.

<Operations and Effects>

Next, operations and effects of the control device for the engine of this embodiment are described.

Figure 12:
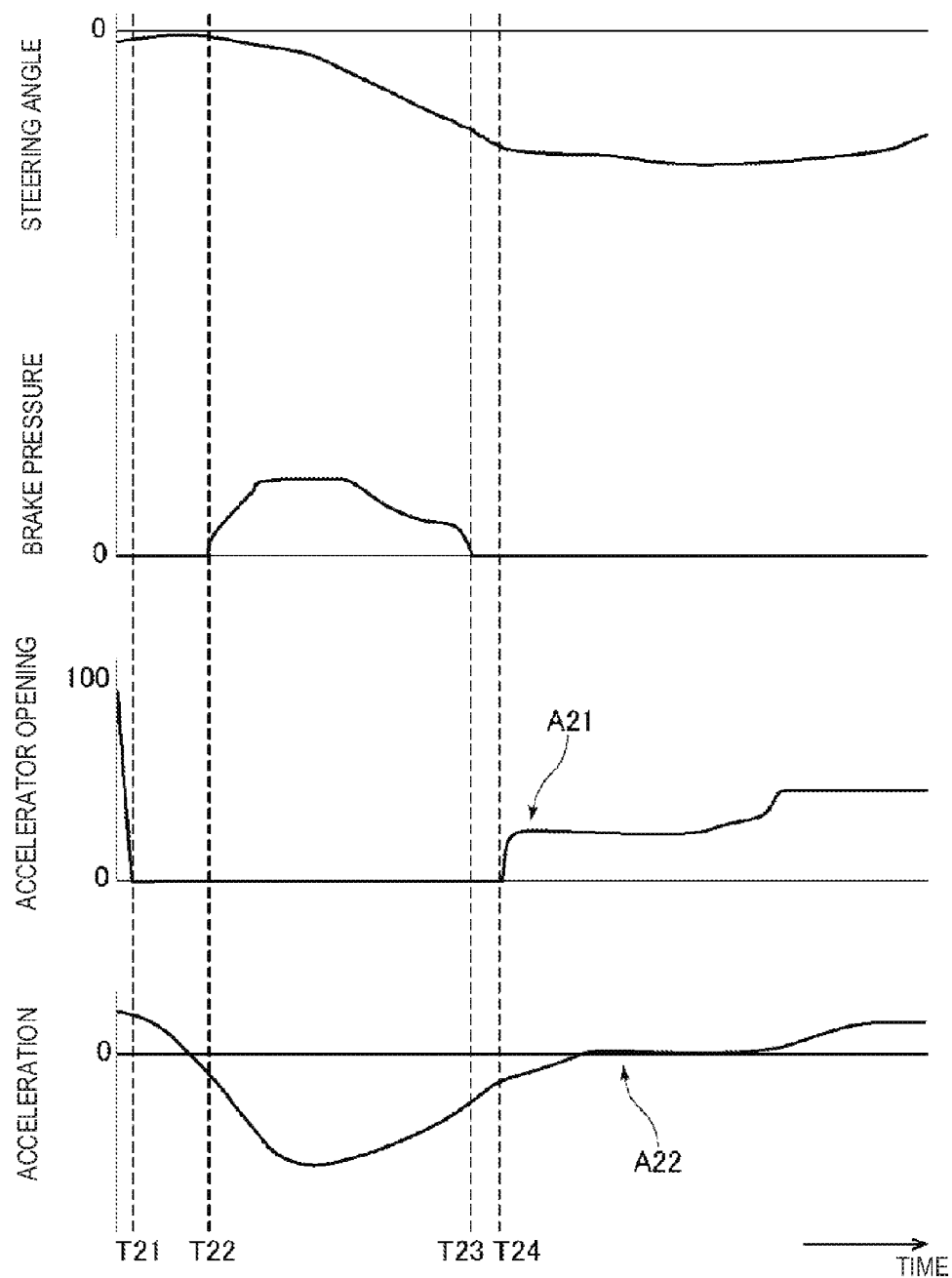
FIG. 12 shows time charts illustrating one example of a behavior of the vehicle in a case where the acceleration characteristic maps of the embodiment of the present invention are applied when the vehicle shifts from a straight-forward traveling state into a turning state.

The operations and effects of the control device for the engine of this embodiment are described in detail with reference to FIG. 12. FIG. 12 shows time charts illustrating one example of a behavior of the vehicle in a case where the acceleration characteristic maps of this embodiment described above are applied when the vehicle shifts from a straight-forward traveling state into a turning state (specifically, when cornering from a turn-in point to a clipping point). Specifically, in FIG. 12, a steering angle, a brake pressure applied in a brake operation, the accelerator opening adjusted in the accelerator operation, and an actual acceleration of the vehicle are indicated in this order from the top.

As illustrated in FIG. 12, first at a time point T21, the accelerator opening becomes zero upon the driver removing their foot from the accelerator pedal 29, then at a time point T22, the brake pressure increases upon the driver pressing the brake pedal with their foot, while the driver controls the steering to turn the vehicle. Then at a time point T23, the brake pressure becomes zero upon the driver removing their foot from the brake pedal, and immediately, at a time point T24, the accelerator opening increases upon the driver pressing the accelerator pedal 29 with their foot. Here, the driver first performs the accelerator operation by placing their foot on the accelerator pedal 29 with no particular intention, so as to cause the vehicle to travel steadily (see the arrow A21). In this embodiment, the acceleration characteristic maps are designed so that the target acceleration becomes zero (see FIGS. 8 and 9A to 9C) within the range of the accelerator opening corresponding to the range of the ankle angle applied when the driver naturally performs the accelerator operation with no particular intention as above (i.e., the range of the ankle angle where the muscle load of the leg becomes a minimum value). Therefore, by controlling the engine torque based on the target accelerations defined in the acceleration characteristic maps, when the driver naturally performs the accelerator operation with no particular intention, the acceleration of the vehicle can suitably and substantially be fixed to zero (see the arrow A22).

Therefore, according to this embodiment, in the situation where the driver switches the position of their foot from the brake pedal to the accelerator pedal for the turn-in, the driver can swiftly cause the vehicle to travel steadily by simply naturally placing their foot on the accelerator pedal 29 with no particular intention. In this case, the driver can easily cause the vehicle to travel steadily by a single operation of the accelerator pedal 29 without correcting the opening of the accelerator pedal 29.

Through setting the target acceleration to zero by using the acceleration characteristic maps as above, the driver can grasp at once the accelerator opening at which the vehicle speed can be kept steady without acceleration or deceleration. As a result, the driver can control acceleration and deceleration of the vehicle by moving their ankle to perform the accelerator operation centering on the accelerator opening at which the grasped vehicle speed can be kept steady.

Further according to this embodiment, the acceleration characteristic maps are defined so that the accelerator opening at which the target acceleration is set to zero is increased as the vehicle speed increases and the gear position becomes higher (see FIG. 10). Therefore, when the vehicle speed and the gear position become high, the pressing force of the accelerator pedal 29 becomes large due to the increase of the accelerator opening at which the target acceleration is set to zero and, thus, the information indicating that the engine load is high can suitably be transmitted to the driver through the accelerator operation. As a result, the unity between the driver and the vehicle can be increased.

<Modifications>

In the above embodiment, the configuration in which the present invention is applied to the engine 10 which is a gasoline engine (see FIG. 2); however, the present invention is not limited to be applied to the gasoline engine, and may similarly be applied to a diesel engine.

Further in the embodiment described above, the accelerator opening at which the target acceleration is set to zero is changed according to both the vehicle speed and the gear position; however, in another example, the accelerator opening at which the target acceleration is set to zero may be changed according to only one of the vehicle speed and gear position, and the accelerator opening at which the target acceleration is set to zero may be fixed regardless of the other one of the vehicle speed and gear position.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Intake Passage
5 Throttle Valve
10 Engine
13 Fuel Injector
18 Variable Intake Valve Mechanism
25 Exhaust Passage
29 Accelerator Pedal
29*a* Pedal Part
30 Accelerator Opening Sensor
39 Vehicle Speed Sensor
50 ECU
50*a* Accelerator Opening Detecting Module
50*b* Target Acceleration Setting Module
50*c* Engine Control Module
100 Engine System

What is claimed is:

1. A control device for an engine, the control device controlling an engine torque based on operation of an organ-type accelerator pedal, comprising:
a processor configured to execute:

an accelerator opening detector for detecting an accelerator opening based on an angle of the accelerator pedal having a stepping surface;
a target acceleration setter for setting a target acceleration of a vehicle based on the accelerator opening detected by the accelerator opening detector; and
an engine controller for adjusting an engine torque to achieve the target acceleration set by the target acceleration setter, the engine controller including a plurality of stored acceleration characteristic maps,
wherein the accelerator pedal is arranged to have a pedal angle at a predetermined initial pedal angle in a state where the accelerator pedal is not pressed, the pedal angle being an angle of the stepping surface with respect to a horizontal surface,
wherein the target acceleration setter sets the target acceleration to zero when the accelerator pedal is pressed and the accelerator opening detected by the accelerator opening detector is within a range of the accelerator opening where a difference between the pressed pedal angle and the initial pedal angle is between 2 and 4 degrees, according to at least one of the plurality of acceleration characteristic maps that is selected based on an operating parameter of the engine, and
wherein the pedal angle corresponding to the zero target acceleration is different in each of the acceleration characteristic maps.

2. The control device of claim 1, wherein the initial pedal angle of the accelerator pedal is 75 degrees, and
wherein the target acceleration setter sets the target acceleration to zero when the accelerator opening detected by the accelerator opening detector is within a range of the accelerator opening where the pressed pedal angle is between 71 and 73 degrees.

3. The control device of claim 2, wherein the target acceleration setter sets the target acceleration to zero when the accelerator opening detected by the accelerator opening detector is within a range of the accelerator opening between 13 and 27 percent.

4. The control device of claim 3, wherein the target acceleration setter increases the accelerator opening at which the target acceleration is set to zero, as a speed of the vehicle increases.

5. The control device of claim 4, wherein the target acceleration setter increases the accelerator opening at which the target acceleration is set to zero, as a gear position becomes higher.

6. The control device of claim 1, wherein the operating parameter is gear position.

7. The control device of claim 1, wherein the operating parameter is vehicle speed.

8. The control device of claim 1, wherein each of the acceleration characteristic maps is a plot of the pedal angle to a vehicle speed for a corresponding gear position.

9. The control device of claim 1, wherein the pedal angle corresponding to the zero target acceleration decreases as a vehicle speed increases in each of the acceleration characteristic maps.

10. The control device of claim 9, wherein the pedal angle corresponding to the zero target acceleration decreases as the vehicle speed increases in a linear relationship within a given range of the accelerator opening in each of the acceleration characteristic maps.

* * * * *